United States Patent
Takaya et al.

(10) Patent No.: US 7,159,330 B2
(45) Date of Patent: Jan. 9, 2007

(54) OIL LEVEL GAUGE GUIDE STRUCTURE

(75) Inventors: Yoshihiro Takaya, Okayama (JP); Masatoshi Hada, Nagoya (JP); Katsuo Saitoh, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 31 days.

(21) Appl. No.: 11/145,963

(22) Filed: Jun. 7, 2005

(65) Prior Publication Data
US 2005/0268479 A1   Dec. 8, 2005

(30) Foreign Application Priority Data
Jun. 8, 2004   (JP)   ............... 2004-169585

(51) Int. Cl.
*G01F 23/04*   (2006.01)

(52) U.S. Cl. ............... 33/726; 33/722; 33/731

(58) Field of Classification Search ........... 33/722–731
See application file for complete search history.

(56) References Cited

U.S. PATENT DOCUMENTS

| 4,331,185 A | * | 5/1982 | Rinaldo et al. ............... 33/722 |
| 5,094,008 A | * | 3/1992 | Murphy et al. ............... 33/723 |
| 5,992,037 A | * | 11/1999 | Klotz ........................... 33/722 |
| 6,289,601 B1 | * | 9/2001 | Bricker ........................ 33/726 |
| 6,785,978 B1 | * | 9/2004 | Matsumoto et al. .......... 33/726 |
| 2003/0121168 A1 | * | 7/2003 | Matsumoto et al. .......... 33/726 |

FOREIGN PATENT DOCUMENTS

| FR | 2 715 224 A1 | 1/1994 |
| JP | 2002-161724 A | 6/2002 |

* cited by examiner

*Primary Examiner*—Yaritza Guadalupe-McCall
(74) *Attorney, Agent, or Firm*—Foley & Lardner LLP

(57) ABSTRACT

An oil level gauge guide structure including an oil level gauge for measuring engine oil of a vehicle. An oil level gauge is held in an oil level gauge guide. A clip is provided having a first end section held to a resinous part fixed to an engine main body, and a second end section held to the oil level gauge guide. The oil level gauge is provided with two linear stoppers contactable with the second end section of the clip, and an O-ring fixed on an end section of the oil level gauge guide. The end section of the oil level gauge guide is inserted into the communication hole in a first direction, while the first end section of the clip is pressed to the resinous part in a second direction. The first and second directions are parallel with each other.

3 Claims, 4 Drawing Sheets

OIL LEVEL GAUGE GUIDE STRUCTURE

BACKGROUND OF THE INVENTION

This invention relates to improvements in an oil level gauge guide structure including an oil level gauge for measuring engine oil of an automotive vehicle, and more particularly to a holding structure for an oil level gauge guide for guiding the oil level gauge.

A conventional oil level gauge guide structure is disclosed in Japanese Patent Provisional Publication No. 2002-0161724 and includes an oil level gauge guide formed of a metallic pipe. An oil level gauge is held to be inserted in and pulled out from the oil level gauge guide. A communication hole is formed in an engine main body in such a manner as to communicate with an oil pan. An upper end section of the oil level gauge guide is attached to the engine main body through a fixing member with screws under a condition in which a lower end section of the oil level gauge guide is inserted into the communication hole.

SUMMARY OF THE INVENTION

The conventional oil level gauge guide structure is arranged as discussed above, and therefore the oil level gauge guide is installed in position by inserting the lower end section of the oil level gauge guide into the communication hole formed in the engine main body while attaching the upper end section of the oil level gauge guide to the engine main body with the screws. Namely, the installation of the oil level gauge guide is accomplished by a combination of quite different holding manners. Accordingly, the installation is troublesome and low in operational efficiency. Additionally, looseness of the screws is liable to occur in the conventional oil level gauge guide structure owing to repetition of vibration throughout a long period of time, thereby causing positional deviation of the oil level gauge guide to occur.

Therefore, an object of the present invention is to provide an improved oil level gauge guide structure which can effectively overcome drawbacks encountered in conventional oil level gauge guide structures.

Another object of the present invention is to provide an improved oil level gauge guide structure by which installation of an oil level gauge guide is facilitated and high in operational efficiency while the oil level gauge guide can be held for a long period of time without positional deviation.

An aspect of the present invention resides in an oil level gauge guide structure, comprising an oil level gauge guide for holding the oil level gauge insertable in and removable from the oil level gauge guide. A clip has a first end section held to a resinous part fixed to an engine main body by being pressed to the resinous part, and a second end section held to the oil level gauge guide by being pressed to the oil level gauge guide. Two linear stoppers are formed on the oil level gauge guide and contactable respectively with opposite side surfaces of the second end section of the clip in a condition in which the second end section of the clip is held to the oil level gauge guide. An O-ring is fixed on an end section of the oil level gauge guide. The end section is inserted into and held in a communication hole in communication with an oil pan. In the oil level gauge guide structure, the end section of the oil level gauge guide is inserted into the communication hole in a first direction so as to be held in the communication hole, while the first end section of the clip is pressed to the resinous part in a second direction so as to be held to the resinous part. The first and second directions are parallel with each other.

Another aspect of the present invention resides in an oil level gauge guide structure, comprising an oil level gauge guide for holding the oil level gauge insertable in and removable from the oil level gauge guide. A clip has a first end section held to a resinous part fixed to an engine main body by being pressed to the resinous part, and a second end section held to the oil level gauge guide by being pressed to the oil level gauge guide. Two linear stoppers are formed on the oil level gauge guide and contactable respectively with opposite side surfaces of the second end section of the clip in a condition in which the second end section of the clip is held to the oil level gauge guide. An O-ring is fixed on an end section of the oil level gauge guide. The end section is inserted into and held in a communication hole in communication with an oil pan. In the oil level gauge guide structure, the oil level gauge guide is bent. The end section of the oil level gauge guide is inserted in the communication hole in a first direction so as to be held in the communication hole. The oil level gauge guide has a holding section to which the second end section of the clip is held. The holding section has an axis extending in a second direction. The first and second directions are different from each other to form an angle between the first and second directions on a plane.

A further aspect of the present invention resides in an oil level gauge guide structure, comprising an oil level gauge guide for holding the oil level gauge insertable in and removable from the oil level gauge guide. A clip has a first end section held to a resinous part fixed to an engine main body by being pressed to the resinous part, and a second end section held to the oil level gauge guide by being pressed to the oil level gauge guide. Two linear stoppers are formed on the oil level gauge guide and contactable respectively with opposite side surfaces of the second end section of the clip in a condition in which the second end section of the clip is held to the oil level gauge guide. An O-ring is fixed on an end section of the oil level gauge guide. The end section is inserted into and held in a communication hole in communication with an oil pan. In the oil level gauge guide structure, the oil level gauge guide is bent. Each stopper of the oil level gauge guide is formed with a cutout. The second end section of the clip has a claw portion formed at each side surface. The claw portion is engaged with the cutout of the stopper.

DETAILED DESCRIPTION OF THE INVENTION

Figure 1:
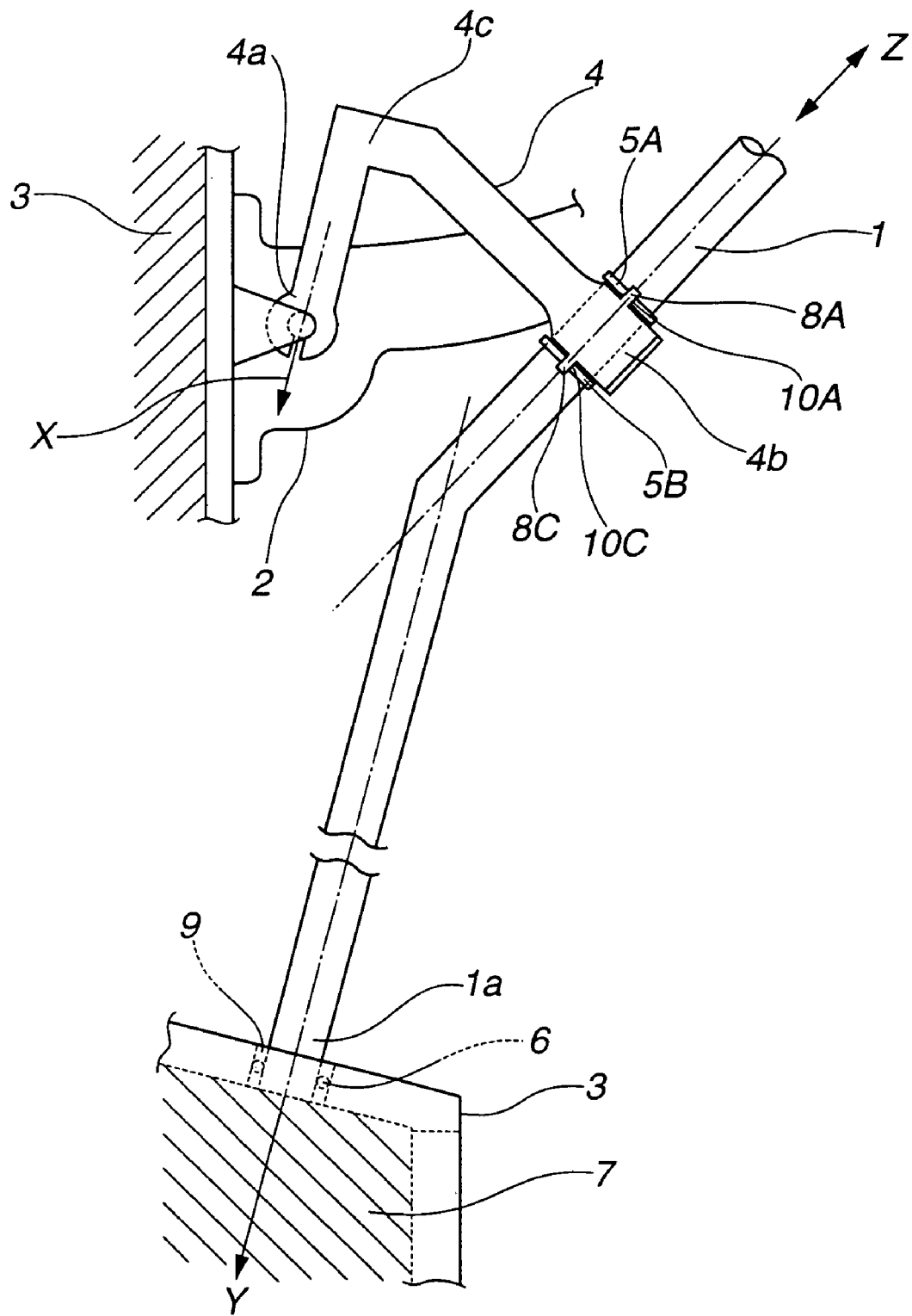
FIG. 1 is a side view of an embodiment of an oil level gauge guide structure according to the present invention.
Figure 2:
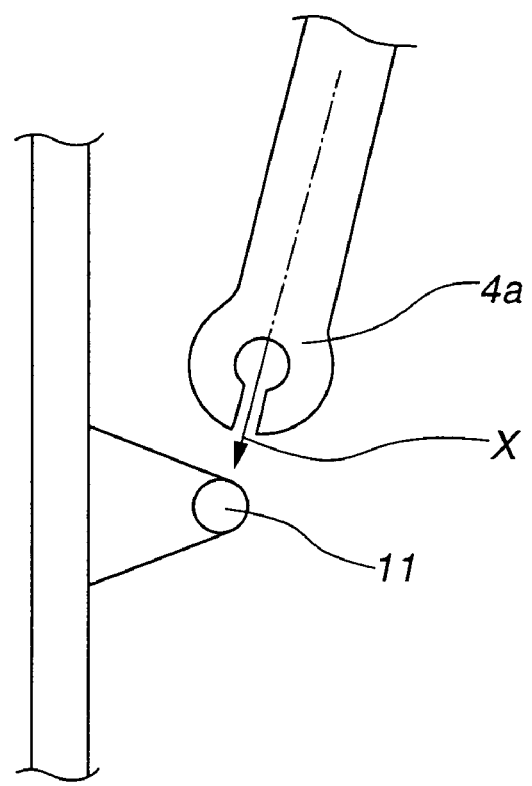
FIG. 2 is a fragmentary enlarged side view of a part of the oil level gauge guide structure of FIG. 1, showing a state in which a clip is disassembled.

Referring now to FIGS. 1 to 6 of the accompanying drawings, an embodiment of an oil level gauge guide structure including a holding device for an oil level gauge, according to the present invention is illustrated. In this case, the oil level gauge guide structure is for an automotive vehicle and includes oil level gauge guide 1 which is formed of a bent metallic pipe and has one end section 1a as a lower end section. Communication hole 9 formed in engine main body 3 is communicated with oil pan 7. Water inlet section 2, which is a resinous or plastic part, is provided to engine main body 3 and has holding shaft 11. Engine cooling water flows into engine main body 3 through water inlet section 2. End section 1a of oil level gauge guide 1 to which O-ring 6 is fixed is inserted and held into communication hole 9. An upper section of oil level gauge guide 1 is held to holding shaft 11 through clip 4. Although communication hole 9 is formed in engine main body 3 in this embodiment, it may be formed in oil pan 7 directly. Material of oil level gauge guide 1 is not limited to metal, so that any material having desirable strength and shape-retaining property, such as resinous material or plastic, is acceptable for the material of the oil level gauge guide. As material of clip 4, resin or plastic, metal and the like may be used, in which resin is desirable from the view point of easiness of adaptation to an article having a complicated shape. As the resinous part provided to engine main body 3 and holding clip 4, a water outlet section (through which engine cooling water flows out of engine main body 3), a cylinder head cover, a surge tank, an intake manifold, an exhaust manifold and the like may be used instead of water inlet section 2 used in this embodiment. It will be understood that the material of both oil level gauge guide 1 and clip 4 are not limited to the above-mentioned ones, and the resinous part is also not limited to the above parts.

Figure 3:
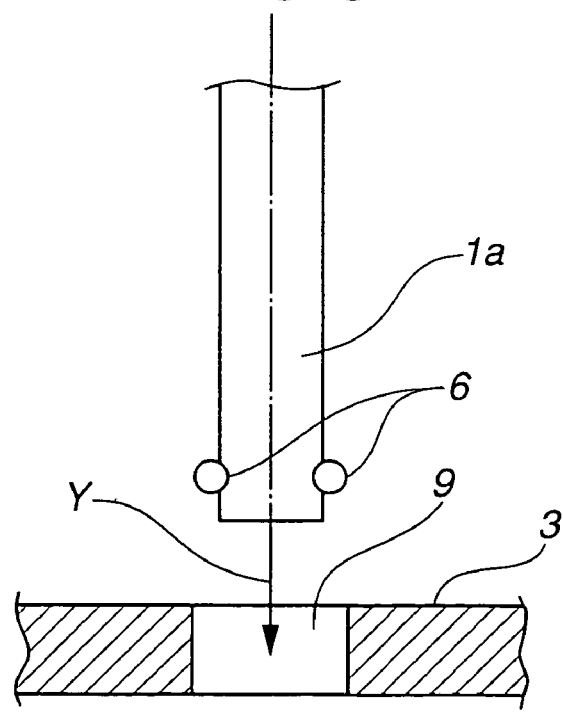
FIG. 3 is a fragmentary enlarged side view of another part of the oil level gauge guide structure of FIG. 1, showing a state in which an oil level gauge guide is disassembled.

Details of the oil level gauge guide structure will be discussed. As shown in FIGS. 1 and 3, oil level gauge guide 1 has end section 1a as the lower end section to which O-ring 6 is fixed. Communication hole 9 formed in engine main body 3 is communicated with oil pan 7. End section 1a is pressed and inserted into communication hole 9, so that oil level gauge guide 1 is fitted and held in position. A direction Y in which oil level gauge guide 1 is pressed and inserted into communication hole 9 is the same as the axial direction of end section 1a of oil level gauge guide 1. Moreover, oil level gauge guide 1 is structurally designed such that a section held by one end section 4b of clip 4 bends relative to the direction Y In addition, two annular stoppers (upper stopper 5A and lower stopper 5B) are formed respectively on upper and lower sides of the section held by end section 4b of clip 4. Upper stopper 5A has two cutouts (upper left cutout 10A and upper right cutout 10B). Lower stopper 5B has two cutouts (lower left cutout 10C and lower right cutout 10D).

Regarding clip 4, a grip piece formed in the other end section 4a of clip 4 is pressed against holding shaft 11 formed on water inlet section 2 so as to be fitted and held on holding shaft 11. The other grip piece formed in end section 4b of clip 4 is pressed against oil level gauge guide 1 so as to be fitted and held on oil level gauge guide 1. As regards a shape of clip 4, clip 4 is formed bending such that a direction X in which end section 4a of clip 4 is pressed to be held to water inlet section 2 is in parallel with or the same as the direction Y in which end section 1a of oil level gauge guide 1 is pressed against and inserted into communication hole 9, under a condition in which end section 4b of clip 4 holds oil level gauge guide 1.

Figure 4A:
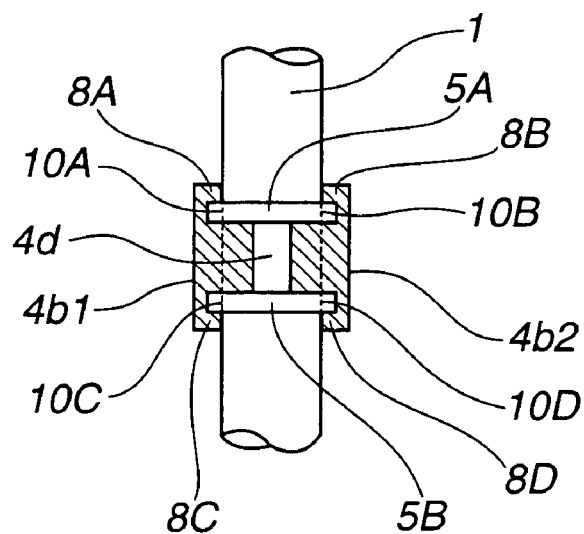
FIG. 4A is a fragmentary enlarged elevational view of a further part of the oil level gauge guide structure of FIG. 1, showing connection between a clip and an oil level gauge guide.

Additionally, as shown in FIG. 4A, end section 4b of clip 4 has upper and lower end faces which are opposite to each other in the axial direction of the section (of oil level gauge guide 1) held by end section 4b. Upper left engaging claw portion 8A and upper right engaging claw portion 8B are formed on the upper end face of end section 4b of clip 4. Lower left engaging claw portion 8C and lower right engaging claw portion 8D are formed on the lower end face of end section 4b of clip 4. Upper left engaging claw portion 8A, upper right engaging claw portion 8B, lower left engaging claw portion 8C and lower right engaging claw portion 8D of clip 4 are located and fitted respectively in upper left cutout 10A, upper right cutout 10B, lower left cutout 10C and lower right cutout 10D of upper and lower stoppers 5A, 5B in a condition where end section 4b of clip 4 holds oil level gauge guide 1. End section 4b of clip 4 has the other grip piece which is formed with opening 4d at its tip end so as to be C-shaped in section. Opening 4d is formed between left end portion 4b1 and right end portion 4b2. Upper left engaging claw portion 8A and lower left engaging claw portion 8C mentioned above are positioned respectively at upper and lower side surfaces of left end portion 4b1. Upper right engaging claw portion 8B and lower right engaging claw portion 8D are positioned respectively at upper and lower side surfaces of right end portion 4b2.

Next, installation procedure for holding oil level gauge guide 1 will be discussed. At the beginning, pressing is made between oil level gauge guide 1 and end section 4b of clip 4, so that oil level gauge guide 1 is fittingly held to clip 4. In this state, insertion of end section 1a of oil level gauge guide 1 into communication hole 9 (formed in engine main body 3) communicated with oil pan 7 is accomplished by pressing end section 1a, simultaneously with fitting end section 4a of clip 4 against holding shaft 11 formed on water inlet section 2 by pressing end section 4a of clip 4, so that the installation of oil level gauge guide 1 is completed.

In the oil level gauge guide structure of the present invention constituted as discussed above, the structure is designed such that an insertion direction Y in which oil level gauge guide is inserted into communication hole 9 formed in engine main body 3 communicated with oil pan 7 is in parallel with or the same as a press direction X in which end section 4a of clip 4 is pressed and fitted to holding shaft 11. Therefore, the insertion of oil level gauge guide 1 into communication hole 9 and fitting of holding shaft 11 into end section 4a of clip 4 can be carried out at the same time by simultaneously pressing oil level gauge guide 1 and clip 4, so that the installation can be facilitated while operational efficiency can be improved. Although oil level gauge guide 1 is shaped bent in this embodiment, it will be understood that the same effects can be exhibited in an oil level gauge guide formed straight. In addition, since the oil level gauge guide structure includes clip 4, looseness in holding can be prevented even upon long-term vibration and the like, and hence positional deviation of the parts of the oil level gauge guide structure does not occur.

Figure 5:
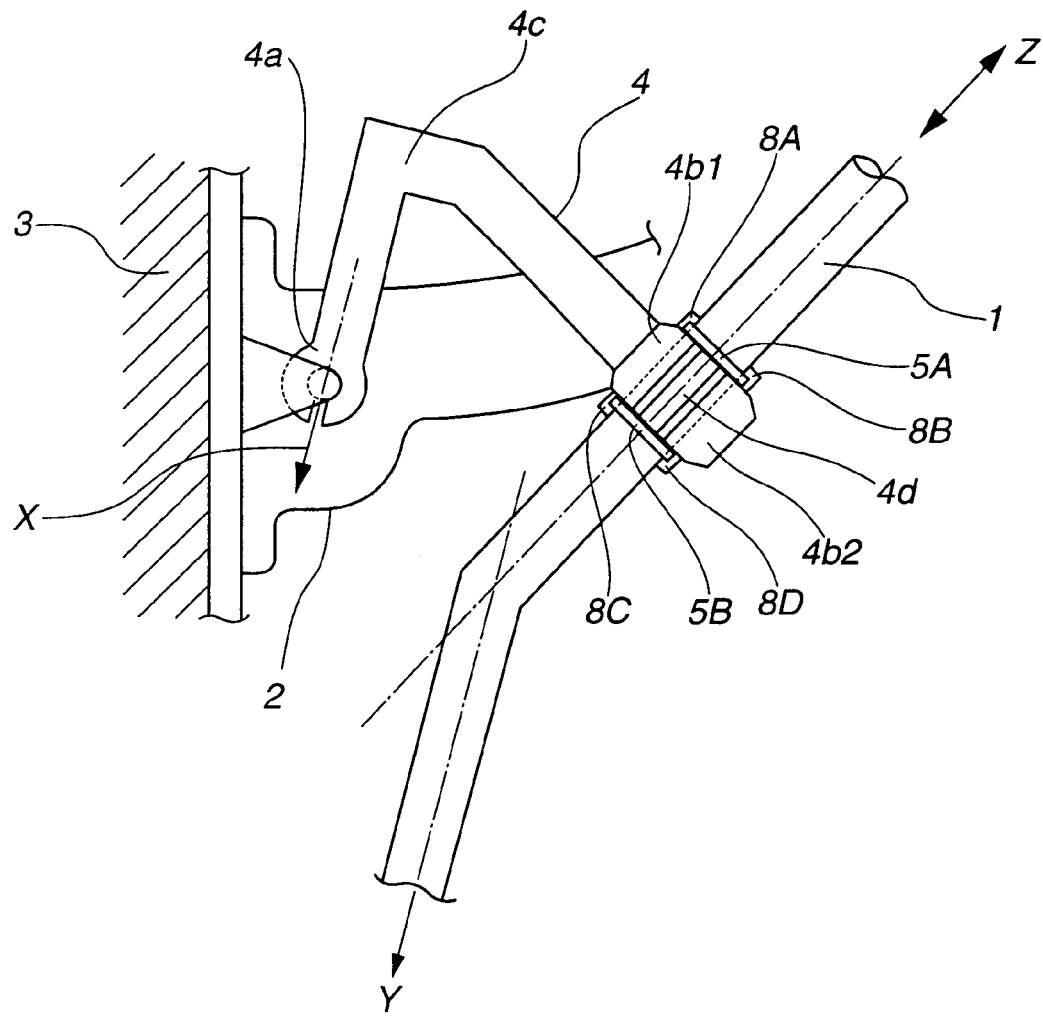
FIG. 5 is a fragmentary side view similar to FIG. 1 but showing a modified example of the embodiment of FIG. 1.

Further, the oil level gauge guide structure of the present invention is structurally designed such that oil level gauge guide 1 has end section 1a which is bent relative to the section held by end section 4b of clip 4. Therefore, the insertion direction Y in which oil level gauge guide is inserted into communication hole 9 formed in engine main body 3 communicated with oil pan 7 differs from an axial direction Z of the section of oil level gauge guide 1 which section is held by end section 4b of clip 4, so that a pressing force for oil level gauge guide 1 to be inserted into communication hole 9 is divided. With this, stress applied to between end section 4b of clip 4 and annular upper and lower stoppers 5A, 5B can be reduced, so that the two stoppers (upper stopper 5A and lower stopper 5B) can be further small-sized. As a result, a space needed for the installation of the parts can be reduced, so that the installation can be facilitated, improving the operational efficiency. As illustrated in FIG. 1, end section 4b of clip 4 is structurally designed such that opening 4d of clip 4 meets a plane containing an axis corresponding to the insertion direction Y of oil level gauge guide into communication hole 9 formed in engine main body 3 communicated with oil pan 7 and another axis corresponding to the axial direction Z of the section (of oil level gauge guide 1) held by end section 4b of clip 4. However, end section 4b of clip 4 may structurally designed such that opening 4d of clip 4 does not meet the plane containing the axis corresponding to the insertion direction Y of oil level gauge guide into communication hole 9 formed in engine main body 3 communicated with oil pan 7 and another axis corresponding to the axial direction Z of the section (of oil level gauge guide 1) held by end section 4b of clip 4, as illustrated in FIG. 5. This can further prevent the parts from dropping off during installation operation while further improving the operational efficiency.

Furthermore, the oil level gauge guide structure of the present invention is structurally designed such that both side surfaces of end section 4b of clip 4 are provided with the four engaging claw portions (upper left engaging claw portion 8A, upper right engaging claw portion 8B, lower left engaging claw portion 8C and lower right engaging claw portion 8D), while the two stoppers (upper stopper 5A and lower stopper 5B) formed on oil level gauge guide 1 are provided with the four cutouts (upper left cutout 10A, upper right cutout 10B, lower left cutout 10C and lower right cutout 10D). The four engaging claw portions are positioned to engage with the four cutouts, respectively, under the condition in which end section 4b of clip 4 is held to oil level gauge guide 1. The four engaging claw portions are brought into contact with upper stopper 5A and lower stopper 5B upon engaging with the four cutouts. As a result, oil level gauge guide 1 can be prevented from the positional deviation in its rotational direction during its installation operation, so that it is unnecessary to take the positional deviation in its rotational direction into consideration during the installation operation. Therefore, oil level gauge guide 1 can be precisely positioned and easily installed, so that the operational efficiency can be improved. With this embodiment in which oil level gauge guide 1 is formed to be bent, a desirable position of oil level gauge guide 1 in its rotational direction has been previously determined, and therefore the installation of oil level gauge guide 1 can not be made if the positional deviation occurs, thereby especially effectively exhibiting the above effects.

Modified examples of the arrangement of the above embodiment will be now discussed.

Figure 4B:
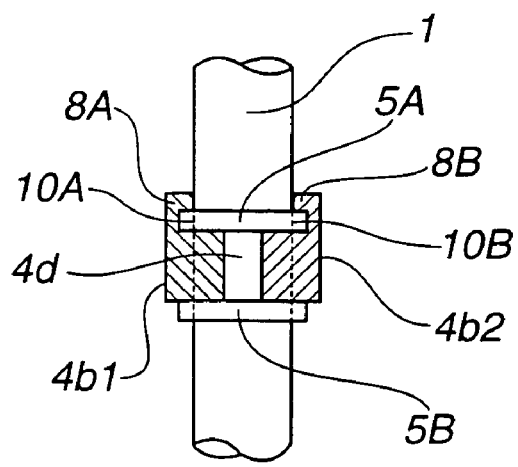
FIG. 4B is a fragmentary enlarged elevational view similar to FIG. 4A but showing a modified example of the connection between a clip and an oil level gauge guide.
Figure 4C:
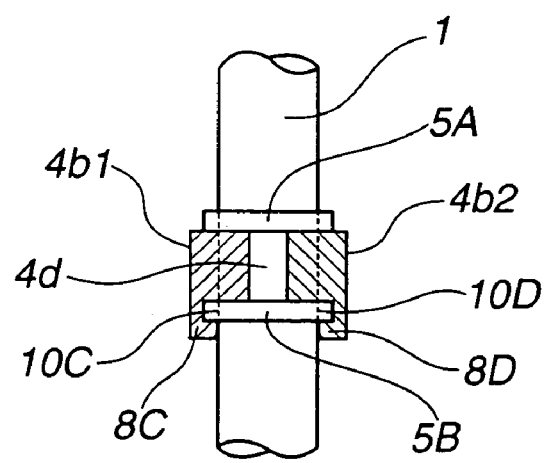
FIG. 4C is a fragmentary enlarged elevational view similar to FIG. 4A but showing another modified example of the connection between a clip and an oil level gauge guide.

A structure including claw portions 8A, 8B, 8C, 8D formed at end section 4b (left and right end portions 4b1, 4b2) and cutouts formed at the two stoppers (upper and lower stoppers 5A, 5B) in the above embodiment as illustrated in FIG. 4A may be arranged as shown in FIG. 4B in which the claw portions and the cutouts are formed only at an upper side including the upper stopper, or arranged as shown in FIG. 4C in which the claw portions and the cutouts are formed only at a lower side including the lower stopper.

Figure 6:
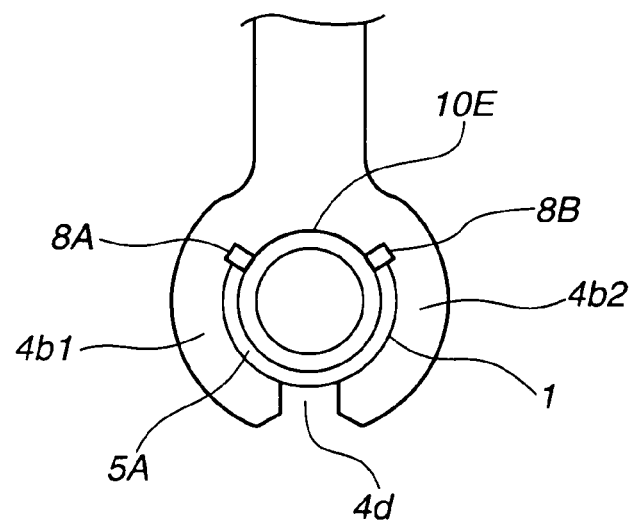
FIG. 6 is a fragmentary top plan view of a part of the clip, showing another modified example of the oil level gauge guide structure according to the present invention.

Additionally, as shown in FIG. 6, a cutout structure at the upper stopper may be constituted of only upper cutout 10E which is generally semicircular in cross-section. In this structure, upper left engaging claw portion 8A is engaged with upper cutout 10E and contacted with left end of upper stopper 5A, and upper right engaging claw portion 8B is engaged with upper cutout 10E and contacted with right end of upper stopper 5A. Such a structure may be applied also to a lower side including the lower side surface of end section 4b of clip 4. With such a structure, the installation operation for end section 4b of clip 4 to be held to oil level gauge guide 1 becomes more facilitated, exhibiting the effects similar to those in the structures illustrated in FIG. 4A to 4C.

As discussed above, according to the present invention, the oil level gauge guide can be facilitated in the installation, improved in the operational efficiency, and held without making its positional deviation throughout a long period of time.

The entire contents of Japanese Patent Applications P2004-169585 (filed Jun. 8, 2004) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An oil level gauge guide structure, comprising:
    an oil level gauge guide for holding an oil level gauge, the oil level gauge being insertable in and removable from the oil level gauge guide;
    a resinous part fixed to an engine main body;
    a clip having a first end section held to the resinous part by being pressed to the resinous part, and a second end section held to the oil level gauge guide by being pressed to the oil level gauge guide;
    two linear stoppers formed on the oil level gauge guide and contactable respectively with opposite side surfaces of the second end section of the clip in a condition in which the second end section of the clip is held to the oil level gauge guide; and
    an O-ring fixed on an end section of the oil level gauge guide, the end section being inserted into and held in a communication hole in communication with an oil pan,
    wherein the end section of the oil level gauge guide is inserted into the communication hole in a first direction so as to be held in the communication hole, the first end section of the clip being pressed to the resinous part in a second direction so as to be held to the resinous part, the first and second directions being parallel with each other.

2. An oil level gauge guide structure, comprising:

an oil level gauge guide for holding an oil level gauge, the oil level gauge being insertable in and removable from the oil level gauge guide;

a resinous part fixed to an engine main body;

a clip having a first end section held to the resinous part by being pressed to the resinous part, and a second end section held to the oil level gauge guide by being pressed to the oil level gauge guide;

two linear stoppers formed on the oil level gauge guide and contactable respectively with opposite side surfaces of the second end section of the clip in a condition in which the second end section of the clip is held to the oil level gauge guide; and an O-ring fixed on an end section of the oil level gauge guide, the end section being inserted into and held in a communication hole in communication with an oil pan, wherein the oil level gauge guide is bent, the end section of the oil level gauge guide being inserted in the communication hole in a first direction so as to be held in the communication hole, the oil level gauge guide having a holding section to which the second end section of the clip is held, the holding section having an axis extending in a second direction, the first and second directions being different from each other to form an angle between the first and second directions on a plane.

3. An oil level gauge guide structure, comprising:

an oil level gauge guide for holding an oil level gauge, the oil level gauge being insertable in and removable from the oil level gauge guide;

a resinous part fixed to an engine main body;

a clip having a first end section held to the resinous part by being pressed to the resinous part, and a second end section held to the oil level gauge guide by being pressed to the oil level gauge guide;

two linear stoppers formed on the oil level gauge guide and contactable respectively with opposite side surfaces of the second end section of the clip in a condition in which the second end section of the clip is held to the oil level gauge guide; and an O-ring fixed on an end section of the oil level gauge guide, the end section being inserted into and held in a communication hole in communication with an oil pan, wherein the oil level gauge guide is bent, each stopper of the oil level gauge guide being formed with an cutout, the second end section of the clip having a claw portion formed at each side surface, the claw portion being engaged with the cutout of the stopper.

* * * * *

UNITED STATES PATENT AND TRADEMARK OFFICE
CERTIFICATE OF CORRECTION

PATENT NO.        : 7,159,330 B2                                              Page 1 of 1
APPLICATION NO.   : 11/145963
DATED             : January 9, 2007
INVENTOR(S)       : Yoshihiro Takaya, Masatoshi Hada and Katsuo Saitoh It is certified that error appears in the above-identified patent and that said Letters Patent is hereby corrected as shown below:

Item (73)     Assignee Data: should read

NISSAN MOTOR CO., LTD., Yokohama (JP); and

AICHI MACHINE INDUSTRY CO., LTD., Nagoya (JP)

Signed and Sealed this

First Day of April, 2008

JON W. DUDAS
*Director of the United States Patent and Trademark Office*